S. W. PARSONS.
HANDLE.
APPLICATION FILED JULY 19, 1920.
1,407,167.          Patented Feb. 21, 1922.
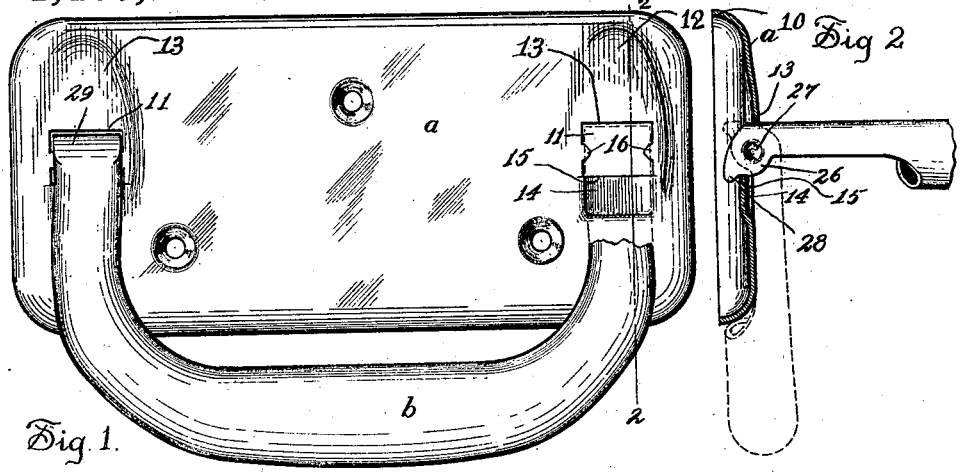
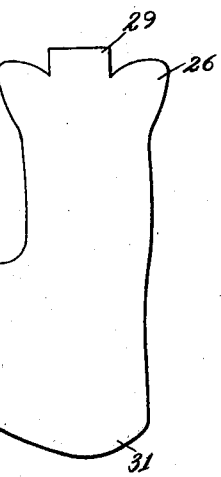
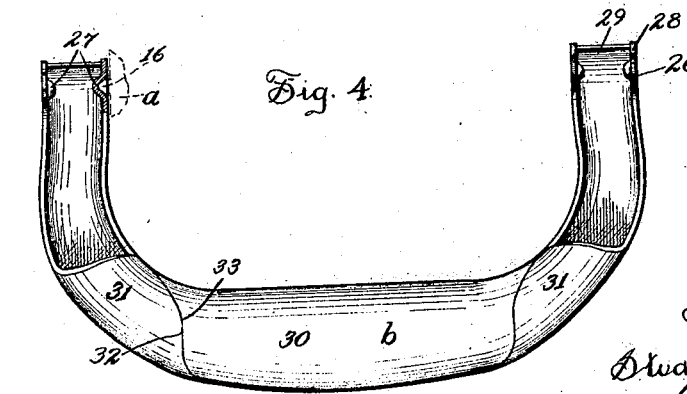
Inventor
Stuart W. Parsons.
His Attorney

UNITED STATES PATENT OFFICE.

STUART W. PARSONS, OF NEW BRITAIN, CONNECTICUT, ASSIGNOR TO THE STANLEY WORKS, OF NEW BRITAIN, CONNECTICUT, A CORPORATION OF CONNECTICUT.

HANDLE.

1,407,167.   Specification of Letters Patent.   Patented Feb. 21, 1922.

Application filed July 19, 1920. Serial No. 397,395.

*To all whom it may concern:*

Be it known that I, STUART W. PARSONS, a citizen of the United States, and a resident of New Britain, county of Hartford, State of Connecticut, have invented certain new and useful Improvements in a Handle, of which the following is a specification.

This invention relates to handles for boxes, trunks and the like and has as the aim to provide a device of this sort characterized by its simplicity and economy in construction, strength and durability, and neatness in appearance.

In the accompanying drawings wherein the preferred embodiment of the present invention is illustrated, Fig. 1 is a front view of a handle with one end of the bail thereof broken away.

Fig. 2 is a view taken on substantially line 2—2 of Fig. 1.

Fig. 3 is a blank from which the bail is formed, and

Fig. 4 is a view of the bail looking at the reverse side to that shown in Fig. 1.

Referring to the drawings in detail, $a$ denotes generally the attaching plate adapted to be secured to a box or the like by screws or otherwise, and $b$ is the bail pivoted to the attaching plate.

The edge of the attaching plate $a$ is bent over as at 10 so as to space the body portion of the plate from the box and thereby provide clearance for the ends of the bail. The attaching plate is provided adjacent each end with a rectangular aperture 11. The portion of the plate above each of these apertures is bulged outwardly, as at 12, so that the upper edge 13 of each aperture is offset forwardly from the plane of the attaching plate, and the portion below each aperture is bulged inwardly, as at 14, so that the lower edge 15 of each aperture is offset rearwardly from the plane of the attaching plate. Formed integral with and projecting from the opposite edges of each of the apertures 11 is a pair of alined prongs 16, and these prongs constitute pintles for the bail $b$.

The bail $b$ is preferably formed from a blank of sheet metal stamped to the shape shown in Fig. 3 as hereinafter described. The arms of this bail are channel-shaped and the webs thereof terminate in ears 26 provided with alined recesses 27 which, as shown, receive the prongs 16. These recesses may be formed by indenting the ears, as shown, or by punching openings therethrough. The shape of the arms of the bail is such that, when the bail is raised as shown in Fig. 2, these arms engage both of the edges 13 and 15 of the apertures 11. Extending from the ears 26 are projections 28 which, when the bail is raised, engage behind the offset portions 14 so that the pintles or prongs 16 are relieved of strains when a pull is exerted on the bail. It will be noted that the upper and lower edges of the apertures 11 are offset in opposite directions to the plane of the attaching plate, and when lifting upwardly on the bail the strains come on these offset portions and practically none on the pintles or prongs 16, and as these offset portions are somewhat in the form of ribs or arches integral at each side with the plate $a$ their strength is increased sufficiently to resist any buckling strains.

A device constructed in accordance with the present invention while having extreme strength may be economically manufactured. The pintles 16 may be formed as described since they receive little or no strains when the handle is in use. The construction of the bail and attaching plate is such that they are sufficiently strong as to not break when subjected to rough usage.

The blank shown in Fig. 3, and from which the bail is formed, is generally of U-shape. In bending up the blank the arms thereof are brought into channel form and a rectangular portion 29 at the end of each arm is bent or rolled back between the ears 26, as shown most clearly in Fig. 4, so as to form a brace which holds these ears in proper spaced relation. Extending from the inner edge of the cross portion of the blank is a flange or wing 30 and at each external corner of the blank is a flange or wing 31 and these several flanges and the body portion of the blank are such that they may be rolled or bent to cylindrical form. It will be noted from Fig. 4 that the edges 32 of the wing 31 and the end edges 33 of the wing 30 abut when the blank has been bent into final shape so as to give an even, unbroken surface. It will further be noted that the bail has a full, cylindrical grip portion which includes or extends about the juncture of the arms and cross portion of the bail so that this grip portion is of substantial width and provides a good, smooth comfortable hand hold. The bail may be formed from the blank without danger of stretching the metal thereof beyond its stretching point, and particularly those portions at the juncture of the arms and cross portion of the bail.

It is of course obvious that the invention is susceptible of various modifications and changes which are within the spirit of the invention without departing from the scope of the following claims, it being understood that the present disclosure of the invention is by way of illustration only and it is not to be taken as restrictive of my conception.

I claim as my invention:—

1. A handle comprising an attaching plate having a pair of apertures, the portions of said plate above each aperture being bulged outwardly relative to the plane of the plate and the portions of said plate below each aperture being bulged inwardly relative to the plane of said plate thus offsetting the upper and lower edges of each aperture in opposite directions relative to the plane of the attaching plate, and a pair of alined prongs integral with and extending from the opposite sides of each aperture; and a bail each arm of which is provided with a pair of alined recesses receiving said prongs, the arms of said bail when in raised position being adapted to engage both the upper and lower edges of each aperture.

2. A U-shaped bail formed of sheet metal and comprising a grip portion and arms channel-shaped in cross section, said grip portion being of tubular cross section and extending around and including the corners at the junctures of said arms and grip portion of the bail.

3. A U-shaped bail formed of sheet metal and comprising a tubular cross portion, end arms, and longitudinally curved tubular portions extending around and including the junctures of said arms and cross portion and forming with the latter a smooth wide grip.

4. That improvement in making U-shaped handles from sheet metal which consists in forming a general U-shaped blank with an inwardly extending flange at the central or grip portion and outwardly extending flanges at the corners between said central portion and said arms; forming the arms up to channel shape and rolling said flanges around but in opposite directions until the corner flanges abut against the ends of the grip flange and the edge of the grip flange abuts against the opposite edge of the grip portion.

5. A U-shaped bail having a grip portion and a pair of arms adapted to be connected at their ends to an attaching plate, said bail being generally of channel shape in cross section and having a central portion or flange extending from the inner edge of the grip portion and a flange extending from each external corner between said grip portion and arms, the central flange being bent to bring its outer edge into abutting relation with the outer edge of the grip portion, and each of the other flanges being bent to bring their edges into abutting relation with the opposing end edges of said central flange.

STUART W. PARSONS.